US012062386B2

(12) United States Patent
Robert Jose et al.

(10) Patent No.: US 12,062,386 B2
(45) Date of Patent: Aug. 13, 2024

(54) SYSTEMS AND METHODS OF GENERATING PERSONALIZED VIDEO CLIPS FOR SONGS USING A POOL OF SHORT VIDEOS

(71) Applicant: Rovi Guides, Inc., San Jose, CA (US)

(72) Inventors: Jeffry Copps Robert Jose, Tamil Nadu (IN); Reda Harb, Issaquah, WA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/876,825

(22) Filed: Jul. 29, 2022

(65) Prior Publication Data

US 2024/0038277 A1 Feb. 1, 2024

(51) Int. Cl.
G11B 27/00 (2006.01)
G11B 27/036 (2006.01)
G11B 27/34 (2006.01)
H04N 5/00 (2011.01)

(52) U.S. Cl.
CPC ............ G11B 27/34 (2013.01); G11B 27/005 (2013.01); G11B 27/036 (2013.01)

(58) Field of Classification Search
CPC ....... G11B 27/00; G11B 27/34; G11B 27/005; G11B 27/036; H04N 5/00; H04N 27/00
USPC .......................... 386/278, 280, 282, 239, 248
See application file for complete search history.

(56) References Cited

U.S. PATENT DOCUMENTS

| | | | |
|---|---|---|---|
| 9,385,983 B1 * | 7/2016 | Sehn ................... | G06F 3/04842 |
| 10,110,942 B2 * | 10/2018 | Lyons ................ | H04N 21/2668 |
| 2010/0223128 A1 * | 9/2010 | Dukellis ............. | H04N 23/667 |
| | | | 715/810 |
| 2023/0421841 A1 | 12/2023 | Doken et al. | |

\* cited by examiner

Primary Examiner — Daquan Zhao
(74) Attorney, Agent, or Firm — Haley Guiliano LLP

(57) ABSTRACT

A plurality of video clips comprising audio of a song are identified from a pool of videos. A portion of the song corresponding to the audio in each video clip is then determined. Using the determined portion, each video clip is mapped to a timeline of the song. A subset of video clips comprising different sections of the song are then selected. Video clips comprising audio from different sections of the song are selected to be included in the personalized video, which is then generated from the selected subset of video clips. The personalized video is then generated for display to the user.

22 Claims, 10 Drawing Sheets

SYSTEMS AND METHODS OF GENERATING PERSONALIZED VIDEO CLIPS FOR SONGS USING A POOL OF SHORT VIDEOS

BACKGROUND

This disclosure is directed to generating personalized videos for songs. In particular, techniques are disclosed for selecting and combining short video clips containing at least a portion of a song to generate a video for the entire song that is personalized for a user.

SUMMARY

Social network services, such as TikTok, allow users to create short videos featuring a portion of a music file (song). The videos are normally 15 to 30 seconds long. These videos can then be watched by other users via the TikTok app. Users can press on an icon to see other videos that feature the same portion of the song. Any video featuring a song indicates (via text) the name of the song. This allows users to discover new songs, and perhaps go to another app such as Apple Music, YouTube, Amazon music, etc. to listen to the full song and even purchase/download the song.

There is currently no feature that allows users to listen to a longer portion of the song (including a complete song) while watching various videos from different users (e.g., users that the profile follows, likes, etc.) that feature different parts of the song. Such feature would be desirable especially if the aggregation of such portions is sourced from profiles that a particular user likes, follows, has not skipped, etc. Users can also specify whether the videos can have properties such as "duet," special effects, etc. This disclosure also anticipates that at least one of the portions of the video is a sponsored video (i.e., an advertisement portion that features a part of the song) or a display ad. Today, users record videos featuring songs, and the content of such videos can be a promotion of a product (e.g., makeup, cream for skin, etc.). Some of these videos are labeled "sponsored"—and therefore, this metadata can be used in selecting the pool of videos that should be played back consecutively to give the illusion of a "video clip" for the song that a user is listening to.

When a video featuring a song is recorded, related metadata is also saved (today some metadata is saved to enable searching). Metadata includes properties such as whether the video is a duet, whether special effects were selected from the special effects section, name of the song, as well as the portion of the song that is featured in the video (e.g., video recorded using minute 1:25 to 1:45). The portion of the song can also be the chorus of the song; this is easily identifiable since the chorus of a song is a section of the song that is repeated throughout the song. The chorus of the song is also clearly labeled in any lyrics file. For example, some music apps display the lyrics file of a song that is playing and allow users to navigate the song—e.g., rewind or fast-forward by tapping the text of the lyrics file. While audio recognition technologies can also be utilized, the song timing data (i.e., data indicating a time within the song from which the audio comes) can always be determined based on the user's configurations while shooting the video since all the music files and their metadata are stored in the social network databases and users select from such available content.

Videos that feature a song are mapped to the timeline of the song (based on the timing metadata that is already available) and such mapping is stored in the database. This allows the automatic selection of various videos that make up a lengthier part of the song (in some instances there might not be videos that feature some audio parts of the song so the whole song can't be played). For example, one of the fields can indicate the section of the song that the video features, such as SongA_1a, SongA_1b; where 1a and 1b represent consecutive portions or two portions with a short time gap. Metadata can be represented in different database structures.

Video "gap fillers" can be used where a video for a portion of the song is not available for a short period of time; the audio can still be played, and a display ad is presented during that short duration (e.g., a targeted ad).

Today, users select a portion of the song that they want featured in their video, and they then start recording the video. One user might select a portion starting at 50 seconds and ending at 70 seconds. Another user might select the portion representing 75 seconds to 95 seconds, etc. Since there might be no video for the gap between 70 and 75, then a display ad or a video ad with no sound can be presented.

This disclosure anticipates the placement of ads based on real-time bidding, e.g., bidding while the song is playing or even at the beginning of playing of the song, since the gaps are known at that time. This allows serving personalized/targeted ads since most of the users are registered users and their preferences are already known to the platform. In essence, this "gap" is an available ad inventory with a defined time (presentation time, and duration time so that it can be inserted to "fill the gap") that can be offered to advertisers. Other advertising models can be used (e.g., depending on the pool of videos used—e.g., does the pool feature "verified" profiles with huge numbers of followers?). Premium ad placements can also be a result of an existing deal where the inventory is already bought.

As mentioned above, the selected pool of videos to construct the "video clip" considers the user's preferences and social relationships with the video creators. It is common today for users to follow some creators, dislike or block other creators, etc. Therefore, the "video clip" for the same song could feature different videos for different users or groups of users based on the parameters mentioned above. Additionally, playing the song again might result in a different set of videos being used as well as a different advertisement.

In one embodiment, these "video clips" can be purchased/downloaded/shared on other platforms for a fee. For example, this would serve as an additional channel for video creators to monetize their content.

Playing sound brings visual content to life for users. In current trends of media consumption on social networking and content sharing websites, there are many places where multiple video content items are played simultaneously. Playing multiple content items in parallel began from the earliest days when asynchronous technology was introduced. Now that adequate resources and processing power are readily available, asynchronous/parallel publishing of content has become even more prevalent. Instagram and Facebook have started showing strips that feature videos. A newly added change is that the video does not show a title or uploader detail, nor a thumbnail, which is what YouTube displays, where multiple videos are required to be shown as a list or grids.

Instead of the thumbnail, Instagram and Facebook start to play the video in mute mode. If there are five videos listed in horizontal order, either all the videos are played in parallel with their sound muted, previews of the videos are played together with the sound of just one of the videos, or a preview of each video is played sequentially with sound not muted. A problem is a scenario where there are multiple videos or streams playing in parallel. It could be a list on Instagram on a mobile device or multiple displays in a public setting.

Instagram and TikTok are prime users of this type of content publishing. Multiple videos are published and shown to users. The audio is the same, or is taken from the same source, in a majority of videos. In some cases, the audios of a number of videos can be associated so that they can be played together.

Systems and methods are described herein for generating a video for a song that is personalized for a user. A plurality of video clips comprising audio of the song are identified from a pool of videos. For example, a pool of videos posted on a social media platform and/or their associated metadata may be analyzed to determine which videos of the pool of videos contain audio from the song. A portion of the song corresponding to the audio in each video clip is then determined. Using the determined portion, each video clip is mapped to a timeline of the song. A subset of video clips comprising different sections of the song is then selected. For example, ten videos may include audio from a one-minute song, with three videos including audio from the first twenty seconds of the song, two videos including audio from the second twenty seconds of the song, and five videos including audio from the last twenty seconds of the song. Video clips comprising audio from different sections of the song are selected to be included in the personalized video, which is then generated from the selected subset of video clips. The personalized video is then generated for display to the user.

In some embodiments, to identify the plurality of video clips comprising audio of the song, metadata describing the audio of all available video clips may be retrieved. A population of video clips whose metadata indicate the presence of audio of at least a portion of the song is then determined. For example, the metadata of each video clip may include identifiers of any audio used in the video clip. The metadata may further include start and end timestamps describing a portion of a larger audio file used in the video clip. From the population of video clips, a subset of video clips relevant to the user is identified. This may be accomplished in several ways. For example, a popularity metric of each video clip may be compared to a threshold popularity and only those video clips whose popularity metric exceeds the threshold may be identified as relevant. In another example, a content creator of each video clip is determined and compared with a list of content creators followed by the user. If a video clip was created by such a content creator, it may be identified as relevant. Similarly, the content creator of each video clip may be compared with a list of content creators whose video clips the user has historically liked. If a video clip was created by such a content creator, even if the user does not follow that content creator, the video clip may be identified as relevant. Video clips created by content creators that are recommended to the user based on the user's watch history may also be identified as relevant. However, video clips created by content creators that have been blocked by the user will not be included. Any combination of these methods may be used to identify relevant video clips for the user.

In some cases, there may be multiple video clips that are mapped to the same start and end points in the timeline of the song. This might be, for example, a chorus or other portion of the song that is repeated multiple times throughout the song. A plurality of video clips that are mapped to these same points are selected, with the number of selected videos corresponding to the number of times the portion of the song is repeated. Each of the selected video clips is then mapped to a different start point in the timeline of the song at which the portion of the song is repeated.

If no video clip has been mapped to a portion of the song, an advertisement may be selected to fill the gap. The advertisement may be a still image or a video clip. If a video clip advertisement is selected, the advertisement may be incorporated into the personalized video without its corresponding audio in order to not interfere with playback of the song. The advertisements selected may be sponsored advertisements, advertisements whose audio includes a portion of the song, and/or advertisements that are targeted to the user.

When video clips are selected for inclusion in the personalized video of the song, it may be preferable to include video clips that feel similar. As one example of such similarity, video clips with similar amounts of action and speed of action may feel similar, while a high-action video may feel dissimilar to a "talking head" video. To determine the similarity, an entropy rating is determined for each video. As used herein, "entropy" describes the amount of motion in a video, which can be correlated with an amount of action. The entropy rating may not be calculated in a vacuum, as movement in the background of a video clip that is otherwise fairly static (e.g., a "talking head") could be misinterpreted as a high-entropy video clip. A machine learning model trained on video clips may be used to generate the entropy ratings. The machine learning model may be capable of distinguishing between simple movements of pixels (such as background movement) and movements corresponding to actions in the video clip. Once entropy ratings for each video clip have been determined, video clips having similar entropy ratings may be selected.

Some video clips may use a portion of the song that has been sped up or slowed down from its original speed. A time signature of the song can be determined, as well as a time signature of the portion of the song contained in the video clip. Based on a difference between the time signatures, a temporal scaling factor may be calculated and applied to the video clip to align the time signature of the portion of the song contained therein with the original time signature of the song.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
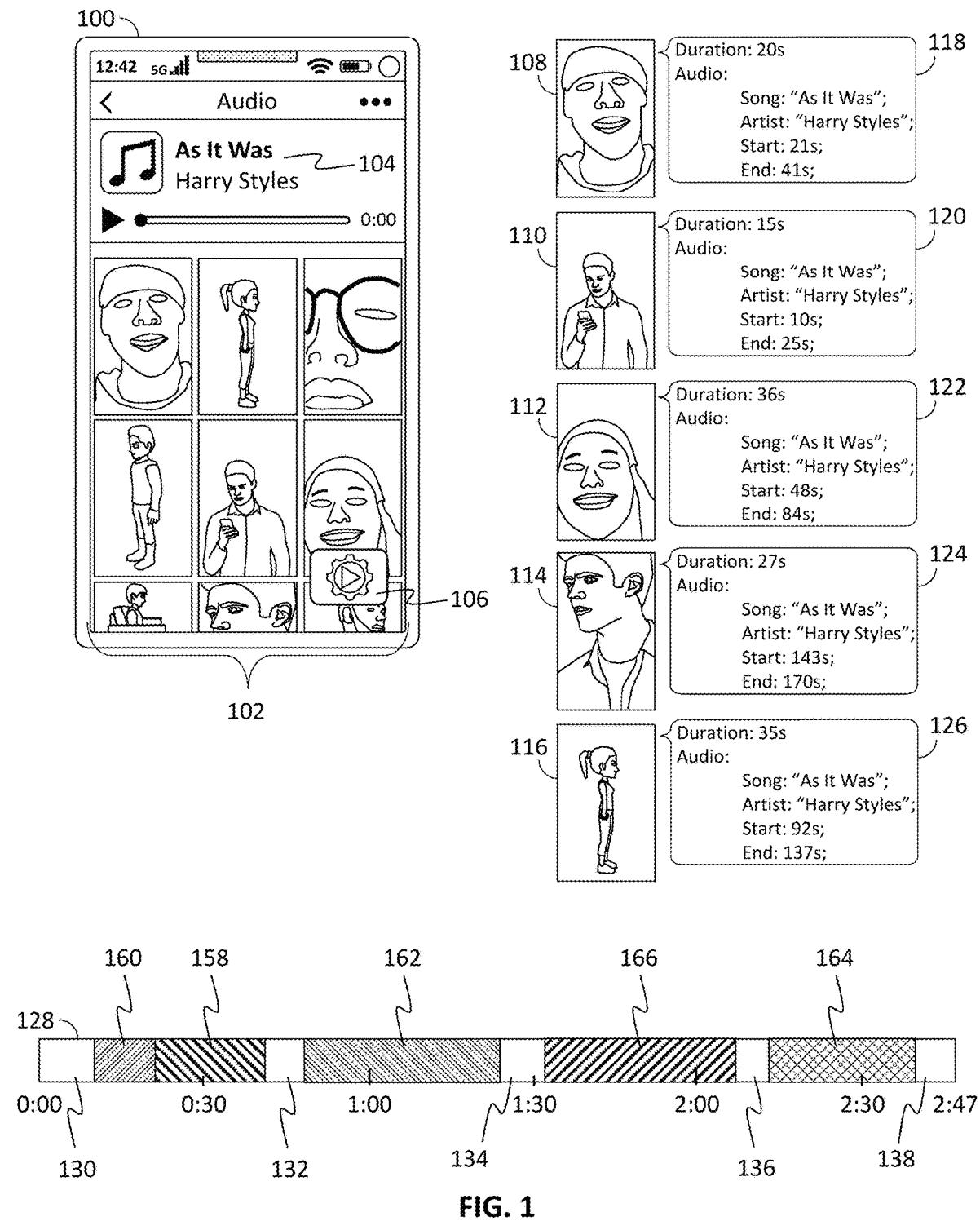
FIG. 1 is an illustrative depiction of video clips comprising audio of a song and mapping of selected video clips to a timeline of the song, in accordance with some embodiments of the disclosure.

FIG. 1 is an illustrative depiction of video clips comprising audio of a song and mapping of selected video clips to a timeline of the song, in accordance with some embodiments of the disclosure. User device 100 may display to a user a plurality of video clips 102 that contain audio comprising at least a portion of song 104. For example, a user may search for videos containing audio of the song "As It Was" by Harry Styles. Alternatively, the user may view a video clip that contains a portion of the song "As It Was" and select a link or other user interface element related to the audio portion of the video clip to see other video clips that use the same audio, or audio from the same song. In response to that selection, an interface such as the one depicted in FIG. 1 may be generated for display on user device 100. Additionally, a user interface element such as icon 106 may be displayed. Selection of the icon 106, or other user interface element, may cause generation of a personalized video for the song. Other methods for initiating generation of the video and presentation of such an option to the user may be used.

Upon selection of icon 106, video clips are selected from the plurality of video clips 102. Video clips may be selected based on popularity, interest to the user, or other factors as will be discussed in more detail below. For example, video clips 108, 110, 112, 114, and 116 may be selected. Each video clip may have associated metadata describing the video. For example, metadata 118, describing video clip 108, includes the duration of video clip 108, as well as information describing the portion of the song contained in video clip 108 including a start time and end time within the song of the portion of the song contained in video clip 108. Metadata 120, 122, 124, and 126 similarly describe video clips 110, 112, 114, and 116, respectively.

Using the metadata, each video clip can be mapped to timeline 128 of the song. Metadata 118 indicates that video clip 108 has a duration of 20 seconds and includes audio of the song "As It Was" from 21 seconds to 41 seconds relative to the start of the song. Video clip 108 can therefore be mapped to portion 158 of timeline 128. Metadata 120 indicates that video clip 110 has a duration of fifteen seconds and includes audio of the song "As It Was" from 10 seconds to 25 seconds relative to the start of the song. Video clip 110 can therefore be mapped to portion 160 of timeline 128. Since there is four-second overlap between the audio of video clip 108 and video clip 110, the duration of one or both of video clips 108 and 110 may be trimmed so that portion 158 of timeline 128 to which video clip 108 is mapped begins when portion 160 of timeline 128 to which video clip 110 is mapped ends. In the example of FIG. 1, the last four seconds of video clip 110 have been removed so that portion 160 ends at 21 seconds. Metadata 122, 124, and 126 are similarly used to map video clips 112, 114, and 116 to portions 162, 164, and 166, respectively, of timeline 128.

In many cases, there may not be video clips mapped to the entirety of timeline 128. Several gaps 130, 132, 134, 136, 138 may exist between mapped portions of timeline 128 that must be filled. These gaps may be filled by advertisements. In some embodiments, targeted advertisements are selected for the user and inserted into the gaps. Depending on the length of a gap, the inserted advertisement may be a video or a still image. For example, a short gap (e.g., five seconds) may be filled by a still image of an advertisement, while a longer gap (e.g., more than five seconds) may be filled by a video advertisement. Some video advertisements may also use audio of the song and may naturally fill a gap in timeline 128. Advertisements that do not use audio of the song may have their audio muted so as not to disrupt the user's enjoyment of the song.

There may be many video clips that use the same portion of the audio of the song and are therefore mapped to the same portion of timeline 128. This is often the case for the chorus of a song or other portion that is repeated throughout the song. If more than one video clip is mapped to a given portion, and the audio of that portion is repeated (and no video clips have been mapped to one of the other portions at which the audio is repeated), video clips may be remapped to the other portions of timeline 128. If the portion of the audio is not repeated, then the best fit video clip of the video clips mapped to the portion of timeline 128 is selected for inclusion in the personalized video. For example, video clips created by content creators liked or followed by the user may be a better fit for the user than videos created by content creators that the user has not been exposed to before or has actively blocked.

Videos clips are selected for inclusion in the personalized video from among the video clips mapped to each portion of the song. In some cases, the selection may be based on popularity of the video clips and/or the content creator of each video clip. In some embodiments, video clips may be ranked by the number and frequency of visual or aural changes in the video clip. This metric is referred to herein as "entropy." In order for the personalized video to feel as seamless as possible to the user, video clips with similar entropy metrics may be selected for inclusion in the personalized video. To generate the entropy score, each video clip may be analyzed for changes in color, brightness, shapes, etc., in the video data, and/or tonal variations, prosody, mel-frequency cepstrum coefficients (MFCCs), etc., in the audio data. A machine learning model trained on video and/or audio data may be used in this analysis to help prevent high entropy scores resulting from simple background movements or noises.

Once video clips and advertisements or other gap fillers have been selected, they can be stitched together into a single video that has been personalized for the user. The audio used for the video may be a full audio track of the song. Alternatively, the audio of each video clip may be preserved within the personalized video. Audio portions may be extracted from an audio track of the song for each portion of the personalized video to which a video clip was not mapped. The extracted audio can be mixed with the audio of the gap filler (e.g., advertisement) or the audio of the gap filler may be muted to allow the song to be heard. The final personalized video is then transmitted to user device 100 for output to the user.

Figure 2:
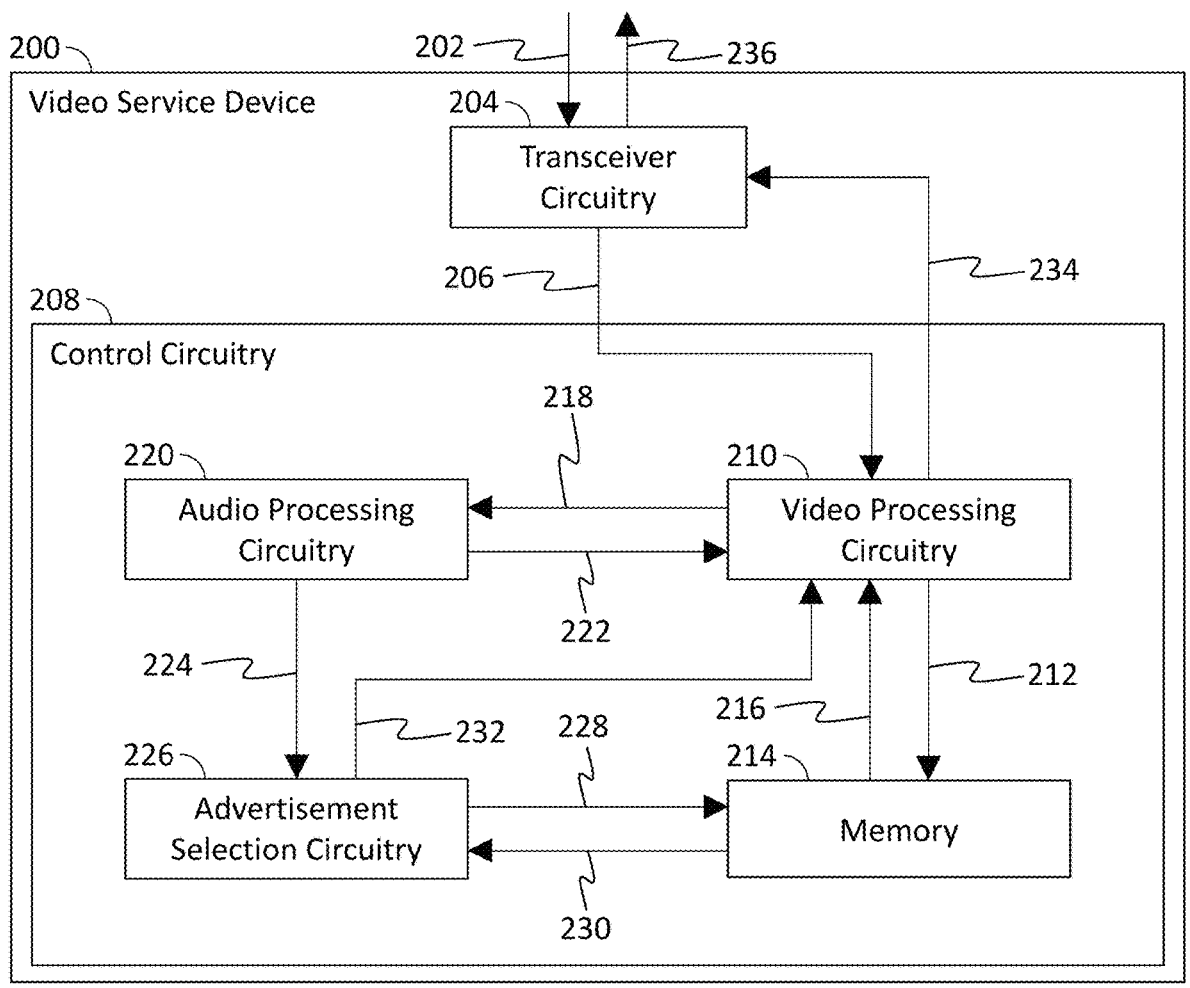
FIG. 2 is a block diagram showing components and dataflow therebetween of a video service device that generates a video for a song that is personalized for a user, in accordance with some embodiments of the disclosure.

FIG. 2 is a block diagram showing components and dataflow therebetween of a video service device that generates a video for a song that is personalized for a user, in accordance with some embodiments of the disclosure. Video service device 200 may be a server or other component of a video-sharing service. Video service device 200 receives 202 a request from a user device for a personalized video for a particular song. For example, the request may include an identifier of the user associated with the user device from which the request was sent and an identifier of the song. The request is received at transceiver circuitry 204. Transceiver circuitry 204 comprises a network connection over which data can be transmitted to and received from remote devices, such as an ethernet connection, Wi-Fi connection, mobile broadband interface, or connection employing any other suitable networking protocol. Transceiver circuitry 204 transmits 206 the request to control circuitry 208, where it is received using video processing circuitry 210.

Control circuitry 208 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Video processing circuitry 210 receives the request and extracts the identifier of the song. Video processing circuitry transmits 212 a request to memory 214 for video clips stored in memory 214 or any local or remote storage device that include audio of the identified song. Alternatively, a database of available video clips may be stored in memory 214 that includes links to corresponding video files that may be stored elsewhere. Memory 214 may be an electronic storage device. As referred to herein, the phrase "electronic storage device" or "storage device" should be understood to mean any device for storing electronic data, such as random-access memory, read-only memory, hard drives, optical drives, solid state devices, quantum storage devices, or any other suitable fixed or removable storage devices, and/or any combination of the same. Each video clip may have associated metadata describing its creator, duration, video content or audio content. Thus, the request transmitted 212 by video processing circuitry 210 may be structured as a request for video clips whose corresponding metadata indicate that they include audio from the song.

In response to the request, video processing circuitry 210 receives 216 a plurality of video clips from memory 214 including audio from the song. Alternatively, video processing circuitry 210 may receive a set of metadata describing the video clips and may separately access and/or retrieve each video clip from its storage location based on a link, URL, or other file locator or resource locator in the metadata of each clip. Video processing circuitry 210 transmits 218 each video clip to audio processing circuitry 220 for analysis. For example, while the metadata of a video clip may indicate that it contains audio from the song, it may not indicate the specific portion of the song. Audio processing circuitry 220 may access a copy of the song or data describing the audio of the song. Audio processing circuitry 220 then compares the audio of each video clip with the audio of the song or data describing the audio of the song to determine a specific portion of the song contained in each video clip. Some video clips may have other audio mixed with the audio of the song. For example, the song may be played in the background of a video while a person is speaking. Audio processing circuitry 220 may isolate the song (e.g., the music, vocals, or both) from other audio in the video clip.

Audio processing circuitry 220 then transmits 222 an indication of the portion of the song to video processing circuitry 210. For example, audio processing circuitry 220 may transmit an identifier of the video clip, a start time within the song, and an end time within the song. Alternatively, the end time may be omitted and video processing circuitry 210 may calculate the end time based on the duration of the video clip.

Audio processing circuitry 220 may track which portions of the song are included in the video clips and identify portions of the song that have not been included. For example, audio processing circuitry 220 may map the audio of each video clip to a portion of a timeline of the song. If no video clip has been mapped to a portion of the song, audio processing circuitry 220 may determine whether the audio of that portion is repeated in the song. For example, the audio of the portion may correspond to the chorus of the song. If more than one video clip was mapped to a portion of the song at which the audio is repeated, one of those video clips may be remapped to the missing portion. If, however, only a single video clip is mapped to the repeated portion, the video clip is not remapped. In some cases, the video clip may be repeated for the repeated portions, while in other cases the repeated portions would become gaps to be filled by other content such as advertisements.

In some cases, supplemental content may be used to fill the gap. In some embodiments, the supplemental content may be an advertisement. Audio processing circuitry 220 transmits 224 a request for an advertisement to advertisement selection circuitry 226. Advertisement selection circuitry 226 may select an advertisement based on the duration of the gap to be filled. For example, if a gap having a duration below a threshold length (e.g., five seconds) is to be filled, a still image advertisement may be selected. If, however, the gap to be filled exceeds the threshold, a video advertisement may be selected. If a video advertisement is to be selected, additional factors may be considered. For example, some advertisements may include audio of the portion of the song corresponding to the gap. The entropy of the advertisement may also be considered, as well as relevance of the advertisement to the user. Advertisement selection circuitry 226 transmits 228 a request to memory 214 or other storage location at which advertisements are stored. The request may include a duration of the gap, whether a still image or video advertisement is requested and an identifier of the song. Advertisement selection circuitry 226 receives 230, in response to the request, at least one advertisement with which to fill the gap. Advertisement selection circuitry 226 then transmits 232 the selected advertisement or a link or other locator of the advertisement to video processing circuitry 210.

Once all video clips, advertisements, and other gap fillers have been selected, video processing circuitry 210 generates a personalized video of the song. Video processing circuitry 210 combines the selected video clips, advertisements, and gap fillers in order based on the portion of the timeline of the song to which they are mapped. Video processing circuitry 210 may mute the audio of all video clips, advertisements, and gap fillers and use a copy of the song as the audio track for the personalized video. Alternatively, video processing circuitry 210 may mix the audio of some or all video clips, advertisements, and gap fillers with the song.

Video processing circuitry 210 transmits 234 the completed personalized video to transceiver circuitry 204. Transceiver circuitry 204 in turn transmits 236 the personalized video to a user device from which the request for the personalized video was received.

Figure 3:
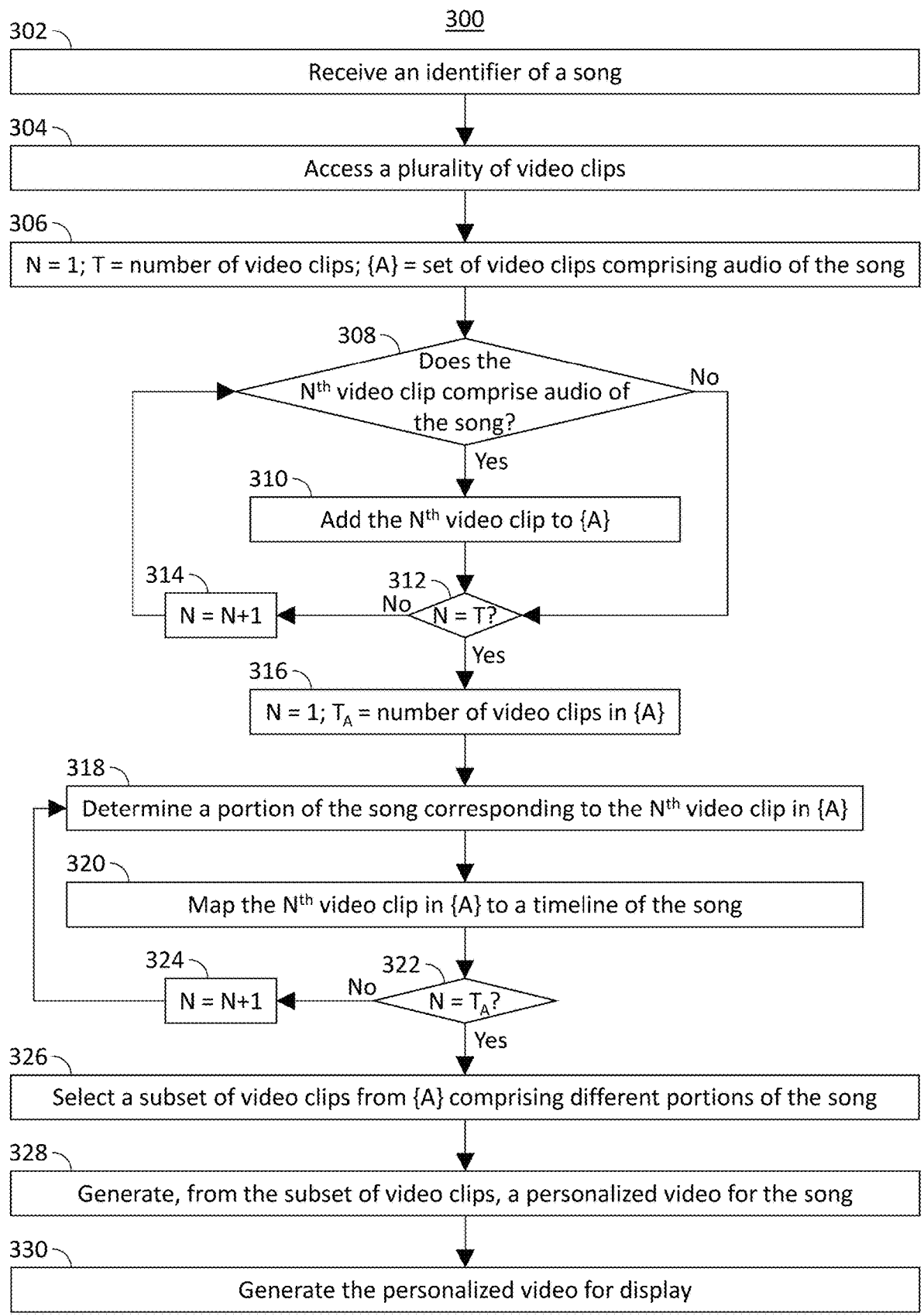
FIG. 3 is a flowchart representing an illustrative process for generating a video for a song that is personalized for a user, in accordance with some embodiments of the disclosure.

FIG. 3 is a flowchart representing an illustrative process 300 for generating a video for a song that is personalized for a user, in accordance with some embodiments of the disclosure. Process 300 may be implemented on control circuitry 208. In addition, one or more actions of process 300 may be incorporated into or combined with one or more actions of any other process or embodiment described herein.

At 302, control circuitry 208 receives an identifier of a song. For example, a request for a personalized video for a particular song may be received from a user device. The request may include the name of the song, or a unique asset identifier used to identify the song. At 304, control circuitry 208 accesses a plurality of video clips. For example, control circuitry 208 accesses a database of video clips or a database of metadata describing video clips available to use in generating the personalized video.

At 306, control circuitry 208 initializes a counter variable N, setting its value to one, a variable T representing the total number of available video clips, and a list or data structure $\{A\}$ representing the set of video clips comprising audio of the song. At 308, control circuitry 208 determines whether the $N^{th}$ video clip comprises audio of the song. For example, control circuitry 208 may extract or otherwise obtain the audio contents of the $N^{th}$ video clip and compare it with audio of the entire song to identify whether the audio of the $N^{th}$ video clip corresponds to a portion of the song. Alternatively, metadata of the $N^{th}$ video clip may be used to identify a source of the audio content of the $N^{th}$ video clip. Thus, the metadata may include an identifier of the song.

If the $N^{th}$ video clip comprises audio of the song ("Yes" at 308), then, at 310, control circuitry 208 adds the $N^{th}$ video clip to $\{A\}$. After adding the $N^{th}$ video clip to $\{A\}$, or if the $N^{th}$ video clip does not comprise audio of the song ("No" at 308), then, at 312, control circuitry 208 determines whether N is equal to T, meaning that all video clips have been processed. If N is not equal to T, then there are additional video clips to process and, at 314, control circuitry 208 increments the value of N by one. Processing then returns to 308.

If N is equal to T ("Yes" at 312), then, at 316, control circuitry 208 resets the value of N to one (or may initialize a new counter variable with a value of one) and a variable $T_A$ representing the total number of video clips in list or data structure $\{A\}$. At 318, control circuitry 208 determines a portion of the song corresponding to the $N^{th}$ video clip in $\{A\}$. For example, control circuitry 208 may compare the audio of the $N^{th}$ video clip with the audio of the song to identify the portion of the song containing matching audio. This may be accomplished using any suitable audio comparison techniques. In some embodiments, metadata associated with the $N^{th}$ video clip may indicate a time within the song from which the audio was taken. This may be any combination of a start time, an end time, and a duration.

At 320, based on the portion to which it was determined that the $N^{th}$ video clip corresponds, control circuitry 208 maps the $N^{th}$ video clip to a timeline of the song. For example, control circuitry 208 may use a data structure having entries, segments, or portions corresponding to time intervals of the song. For a one-minute song, the data structure may be sixty entries, one for each second of the song. In some embodiments, an identifier of the $N^{th}$ video clip may be placed in every entry of the data structure corresponding to the portion of the song included in the $N^{th}$ video clip. Entries in the data structure may allow for multiple video clip identifiers to be placed therein, as multiple video clips may include the same or overlapping portions of the audio of the song. Other types of data structures and other methods of mapping may be used.

At 322, control circuitry 208 determines whether N is equal to $T_A$, meaning that all video clips in $\{A\}$ have been mapped to the timeline of the song. If N is not equal to T ("No" at 322), then, at 324, control circuitry 208 increments the value of N by one, and processing returns to 318. If N is equal to T ("Yes" at 322), then, at 326, control circuitry 208 selects a subset of video clips from $\{A\}$ comprising different portions of the song. Control circuitry 208 may select one video clip for each portion of the song to which at least one video clip has been mapped. Different methods for selecting the subset of video clips will be described below in connection with FIGS. 4-7 and FIG. 10.

At 328, control circuitry 208 generates, from the subset of video clips, a personalized video for the song. Control circuitry 208 may combine the video portion of each video clip in the subset of video clips into a single video. The order in which the videos are combined is based on the order in which the portions of the audio of the song contained within each video clip are found in the song. An audio track of the song may be used as the audio for the personalized video, with the original audio of all video clips being muted. Alternatively, some or all of the audio of some or all of the video clips may be mixed with the audio of the song. In other embodiments, the audio of each video clip is left intact and unaltered in the personalized video. At 330, control circuitry 208 generates the personalized video for display. For example, control circuitry 208 renders the personalized video, encodes the personalized video in a video format compatible with the user device, and transmits or streams the personalized video to the client device for display to the user.

The actions or descriptions of FIG. 3 may be used with any other embodiment of this disclosure. In addition, the actions and descriptions described in relation to FIG. 3 may be done in suitable alternative orders or in parallel to further the purposes of this disclosure.

Figure 4:
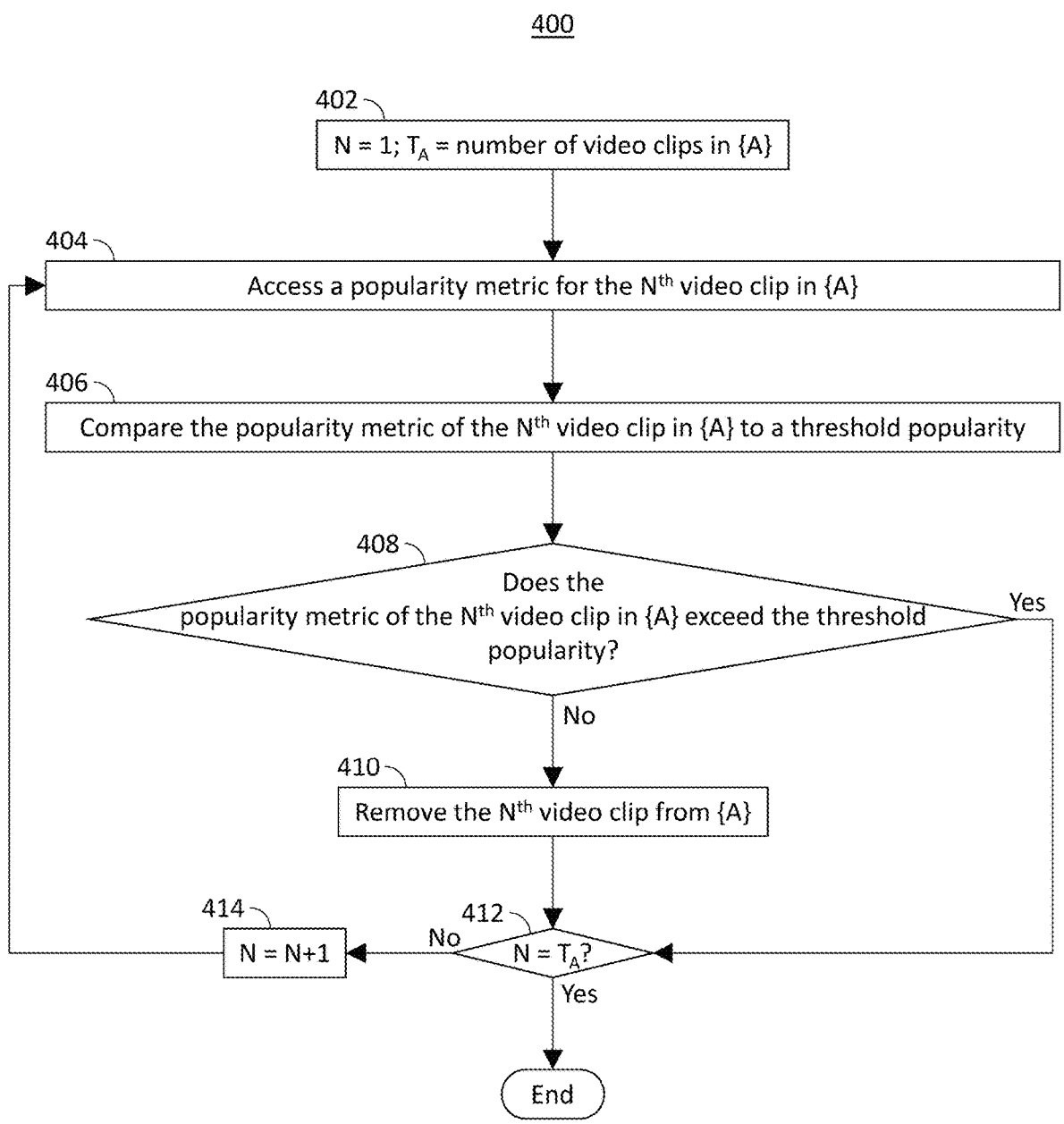
FIG. 4 is a flowchart representing an illustrative process for identifying relevant video clips based on popularity, in accordance with some embodiments of the disclosure.

FIG. 4 is a flowchart representing an illustrative process 400 for identifying relevant video clips based on popularity, in accordance with some embodiments of the disclosure. Process 400 may be implemented on control circuitry 208. In addition, one or more actions of process 400 may be incorporated into or combined with one or more actions of any other process or embodiment described herein.

At 402, control circuitry 208 initializes a counter variable N, setting its value to one, and a variable $T_A$ representing the number of video clips in $\{A\}$. At 404, control circuitry 208 accesses a popularity metric for the $N^{th}$ video clip in $\{A\}$. For example, control circuitry 208 may access data relating to a number of views of the $N^{th}$ video clip over all or in a certain period of time. Control circuitry 208 may use the number of views to directly determine a popularity of the $N^{th}$ video clip or may use the number of views over time to determine if the $N^{th}$ video clip is trending up or down in views. At 406, control circuitry 208 compares the popularity metric of the $N^{th}$ video clip in {A} to a threshold popularity. The threshold popularity value may differ depending on the type of popularity data being considered by control circuitry 208. For example, if the popularity metric is the number of views of the $N^{th}$ video over all, then the threshold may be a certain number of views, such as ten thousand views. If the popularity metric is based on change in views over a certain period of time then the threshold may be a number of view in the period of time (e.g., one thousand views in the last hour) or a rate of change in views over time (e.g., an increase in number of views per hour, either a by a set number or a percentage of a base number of views per hour).

At 408, control circuitry 208 determines whether the popularity metric of the $N^{th}$ video exceeds the threshold popularity. If not ("No" at 408), then, at 410, the $N^{th}$ video clip is removed from {A} so that it will not be selected for inclusion in the personalized video. After removing the $N^{th}$ video clip from {A}, or if the popularity metric of the $N^{th}$ video clip exceeds the threshold popularity ("Yes" at 408), at 412, control circuitry 208 determines whether N is equal to $T_A$, meaning that all video clips in {A} have been processed. If N is not equal to $T_A$ ("No" at 412), then, at 414, control circuitry 208 increments the value of N by one and processing returns to 404. If N is equal to $T_A$ ("Yes" at 412), then the process ends.

The actions or descriptions of FIG. 4 may be used with any other embodiment of this disclosure. In addition, the actions and descriptions described in relation to FIG. 4 may be done in suitable alternative orders or in parallel to further the purposes of this disclosure.

Figure 5:
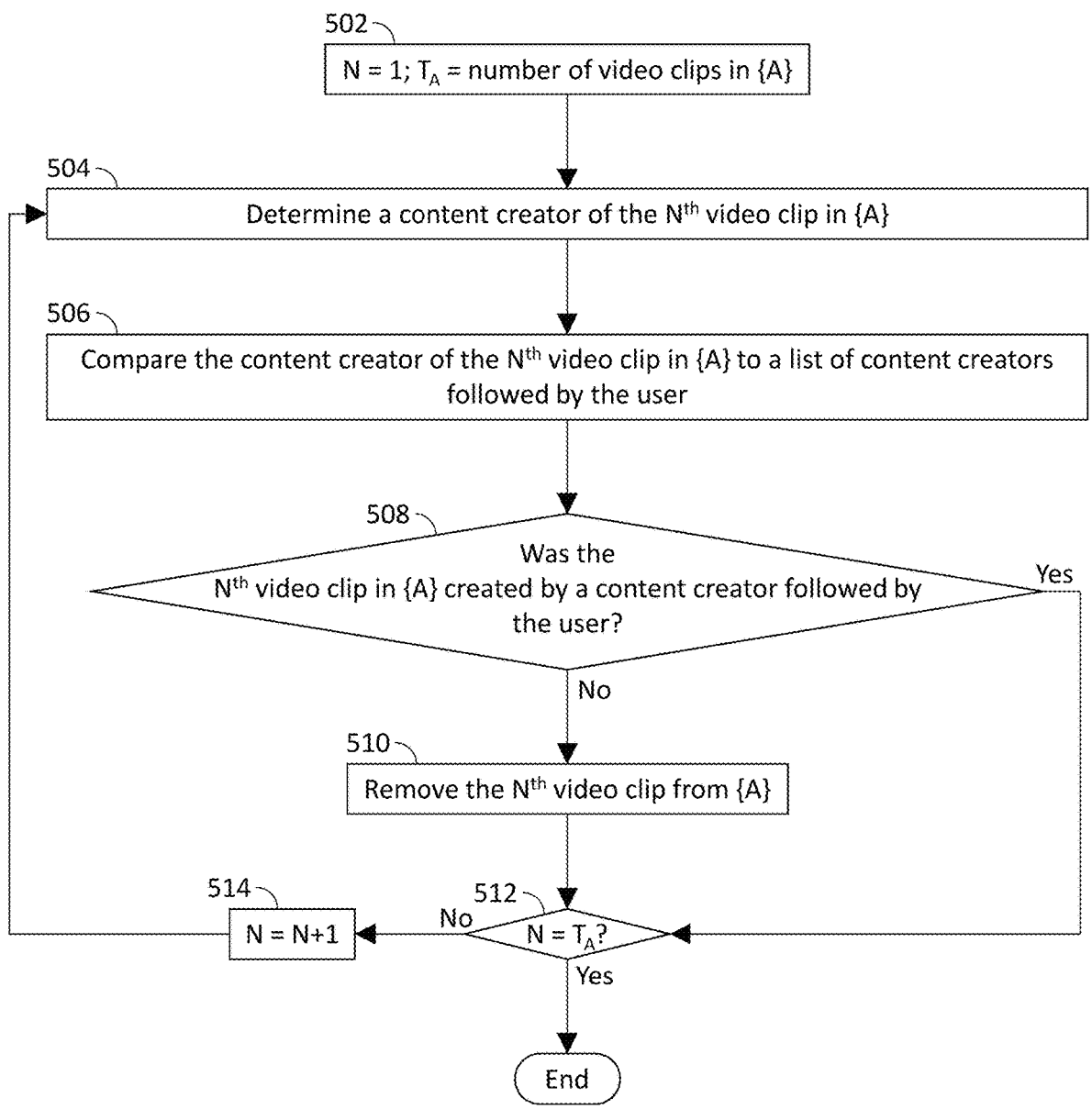
FIG. 5 is a flowchart representing an illustrative process for identifying relevant video clips based on content creators followed by the user, in accordance with some embodiments of the disclosure.

FIG. 5 is a flowchart representing an illustrative process 500 for identifying relevant video clips based on content creators followed by the user, in accordance with some embodiments of the disclosure. Process 500 may be implemented on control circuitry 208. In addition, one or more actions of process 500 may be incorporated into or combined with one or more actions of any other process or embodiment described herein.

At 502, control circuitry 208 initializes a counter variable N, setting its value to one, and a variable $T_A$ representing the number of video clips in {A}. At 504, control circuitry 208 determines a content creator of the $N^{th}$ video clip in {A}. For example, control circuitry 208 may access metadata associated with the $N^{th}$ video clip and retrieve a username or identifier of an account from which the $N^{th}$ video clip was uploaded.

At 506, control circuitry 208 compares the content creator of the $N^{th}$ video clip to a list of content creators followed by the user. As the user interacts with the video-sharing platform, the user may choose to follow content creators whose content they enjoy. For example, while watching a video clip, the user may be presented with an option to "follow" the content creator of the video clip. A list of content creators followed by the user is then maintained in association with the user's account (e.g., in a user profile). The video-sharing platform may show the user video clips from followed content creators more often and recommend to the user video clips from similar content creators. At 508, control circuitry 208 determines whether the $N^{th}$ video clip in {A} was created by a content creator followed by the user, based on the above comparison between the content creator of the $N^{th}$ video clip and the list of content creators followed by the user.

If the $N^{th}$ video clip was created by a content creator that the user does not follow ("No" at 508), then, at 510, the $N^{th}$ video clip is removed from {A} so that it will not be selected for inclusion in the personalized video. After removing the $N^{th}$ video clip from {A}, or if the $N^{th}$ video clip was created by a content creator followed by the user ("Yes" at 508), at 512, control circuitry 208 determines whether N is equal to $T_A$, meaning that all video clips in {A} have been processed. If N is not equal to $T_A$ ("No" at 512), then, at 514, control circuitry 208 increments the value of N by one and processing returns to 504. If N is equal to $T_A$ ("Yes" at 512), then the process ends.

The actions or descriptions of FIG. 5 may be used with any other embodiment of this disclosure. In addition, the actions and descriptions described in relation to FIG. 5 may be done in suitable alternative orders or in parallel to further the purposes of this disclosure.

Figure 6:
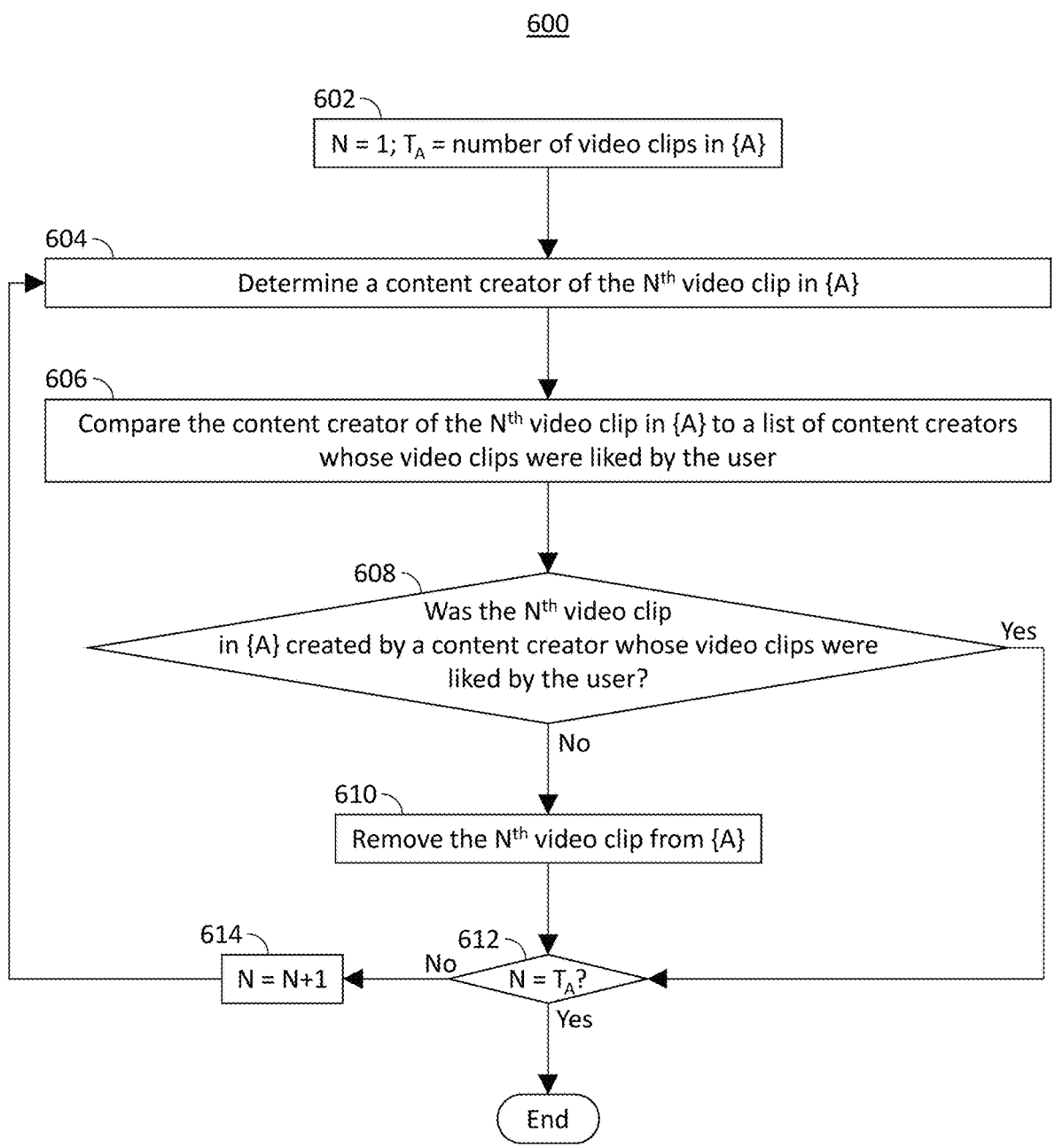
FIG. 6 is a flowchart representing an illustrative process for identifying relevant video clips based on content creators whose video clips were liked by the user, in accordance with some embodiments of the disclosure.

FIG. 6 is a flowchart representing an illustrative process 600 for identifying relevant video clips based on content creators whose video clips were liked by the user, in accordance with some embodiments of the disclosure. Process 600 may be implemented on control circuitry 208. In addition, one or more actions of process 600 may be incorporated into or combined with one or more actions of any other process or embodiment described herein.

At 602, control circuitry 208 initializes a counter variable N, setting its value to one, and a variable $T_A$ representing the number of video clips in {A}. At 604, control circuitry 208 determines a content creator on the $N^{th}$ video clip in {A}. For example, control circuitry 208 may access metadata associated with the $N^{th}$ video clip and retrieve a username or identifier of an account from which the $N^{th}$ video clip was uploaded.

At 606, control circuitry 208 compares the content creator of the $N^{th}$ video clip to a list of content creators whose video clips were liked by the user. As the user interacts with the video-sharing platform, the user may "like" video clips that they enjoy. For example, while watching a video clip, the user may be presented with options to "like" or "dislike" the video clip. A list of video clips liked by the user is then maintained in association with the user's account (e.g., in a user profile). The video-sharing platform may identify the content creators of the liked video clips and show the user video clips from those content creators and recommend to the user similar video clips from the same or other content creators. At 608, control circuitry 208 determines whether the $N^{th}$ video clip in {A} was created by a content creator whose video clips were liked by the user, based on the above comparison between the content creator of the $N^{th}$ video clip and the list of content creators whose video clips were liked by the user.

If the $N^{th}$ video clip was created by a content creator whose video clips were not liked by the user ("No" at 608), then, at 610, the $N^{th}$ video clip is removed from {A} so that it will not be selected for inclusion in the personalized video. After removing the $N^{th}$ video clip from {A}, or if the $N^{th}$ video clip was created by a content creator followed by the user ("Yes" at 608), at 612, control circuitry 208 determines whether N is equal to $T_A$, meaning that all video clips in {A} have been processed. If N is not equal to $T_A$ ("No" at 612), then, at 614, control circuitry 208 increments the value of N by one and processing returns to 604. If N is equal to $T_A$ ("Yes" at 612), then the process ends.

The actions or descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
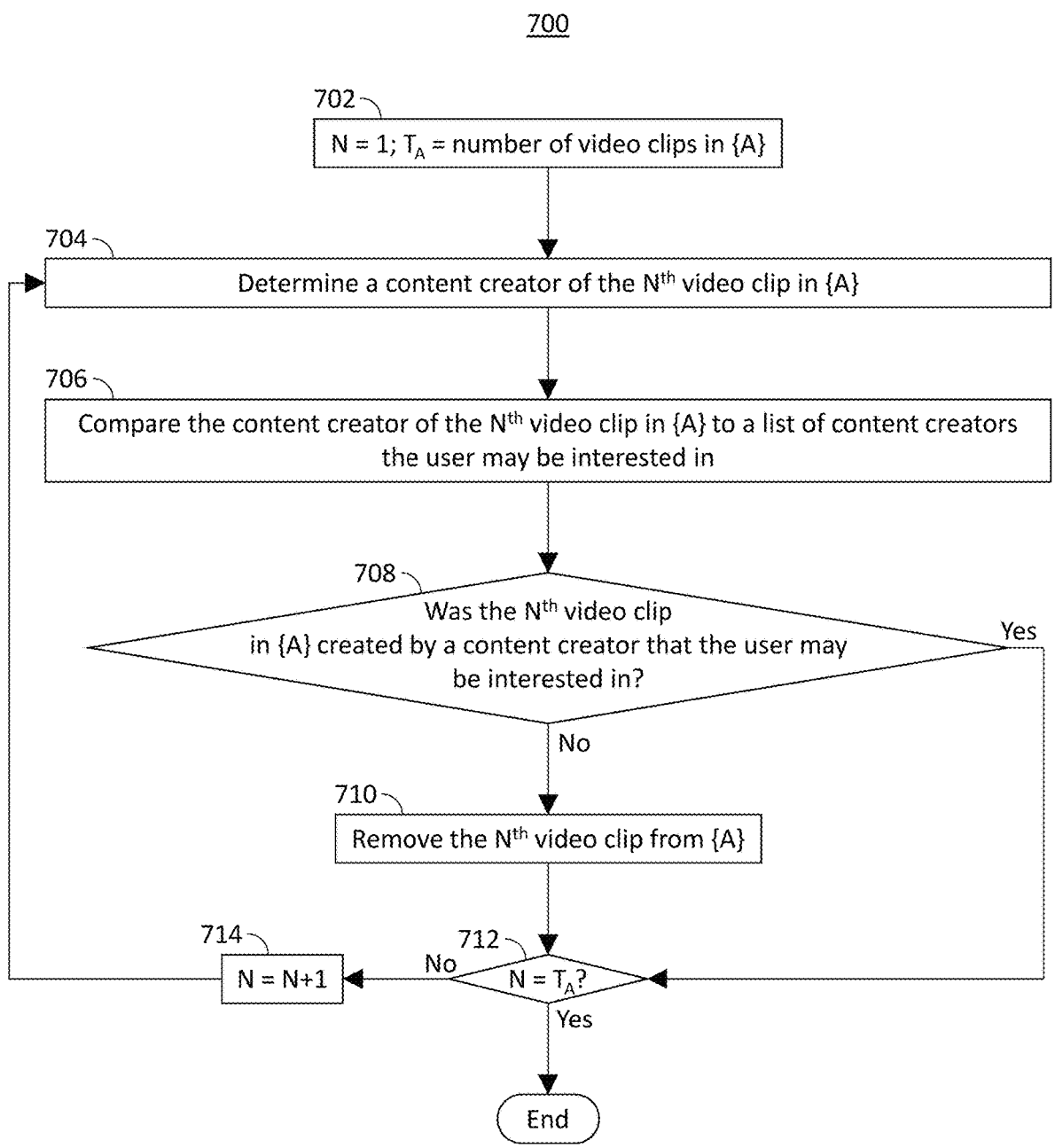
FIG. 7 is a flowchart representing an illustrative process for identifying relevant video clips based on content creators the user may be interested in, in accordance with some embodiments of the disclosure.

FIG. 7 is a flowchart representing an illustrative process 700 for identifying relevant video clips based on content creators the user may be interested in, in accordance with some embodiments of the disclosure. Process 700 may be implemented on control circuitry 208. In addition, one or more actions of process 700 may be incorporated into or combined with one or more actions of any other process or embodiment described herein.

At 702, control circuitry 208 initializes a counter variable N, setting its value to one, and a variable $T_A$ representing the number of video clips in {A}. At 704, control circuitry 208 determines a content creator on the $N^{th}$ video clip in {A}. For example, control circuitry 208 may access metadata associated with the $N^{th}$ video clip and retrieve a username or identifier of an account from which the $N^{th}$ video clip was uploaded.

At 706, control circuitry 208 compares the content creator of the $N^{th}$ video clip to a list of content creators the user may be interested in. As the user interacts with the video-sharing platform, the user may "like" video clips that they enjoy and/or "follow" content creators whose video clips they enjoy. For example, while watching a video clip the user may be presented with options to "like" or "dislike" the video clip or to "follow" the content creator. A list video clips liked by the user and content creators followed by the user is then maintained in association with the user's account (e.g., in a user profile). The video-sharing platform may use similar lists associated with the user's friends or with users in a similar demographic as the user to identify content creators that the user may be interested in. For example, a content creator whose video clips have been liked by a majority of the user's friends may be of interest to the user. The video-sharing platform may also use characteristics of the video clips liked by the user to identify content creators who have published similar video clips. At 708, control circuitry 208 determines whether the $N^{th}$ video clip in {A} was created by a content creator whose video clips that the user may be interested in, based on the above comparison.

If the $N^{th}$ video clip was not created by a content creator that the user may be interested in ("No" at 608), then, at 710, the $N^{th}$ video clip is removed from {A} so that it will not be selected for inclusion in the personalized video. After removing the $N^{th}$ video clip from {A}, or if the $N^{th}$ video clip was created by a content creator that the user may be interested in ("Yes" at 708), at 712, control circuitry 208 determines whether N is equal to $T_A$, meaning that all video clips in {A} have been processed. If N is not equal to $T_A$ ("No" at 612), then, at 714, control circuitry 208 increments the value of N by one and processing returns to 704. If N is equal to $T_A$ ("Yes" at 712), then the process ends.

The actions or descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
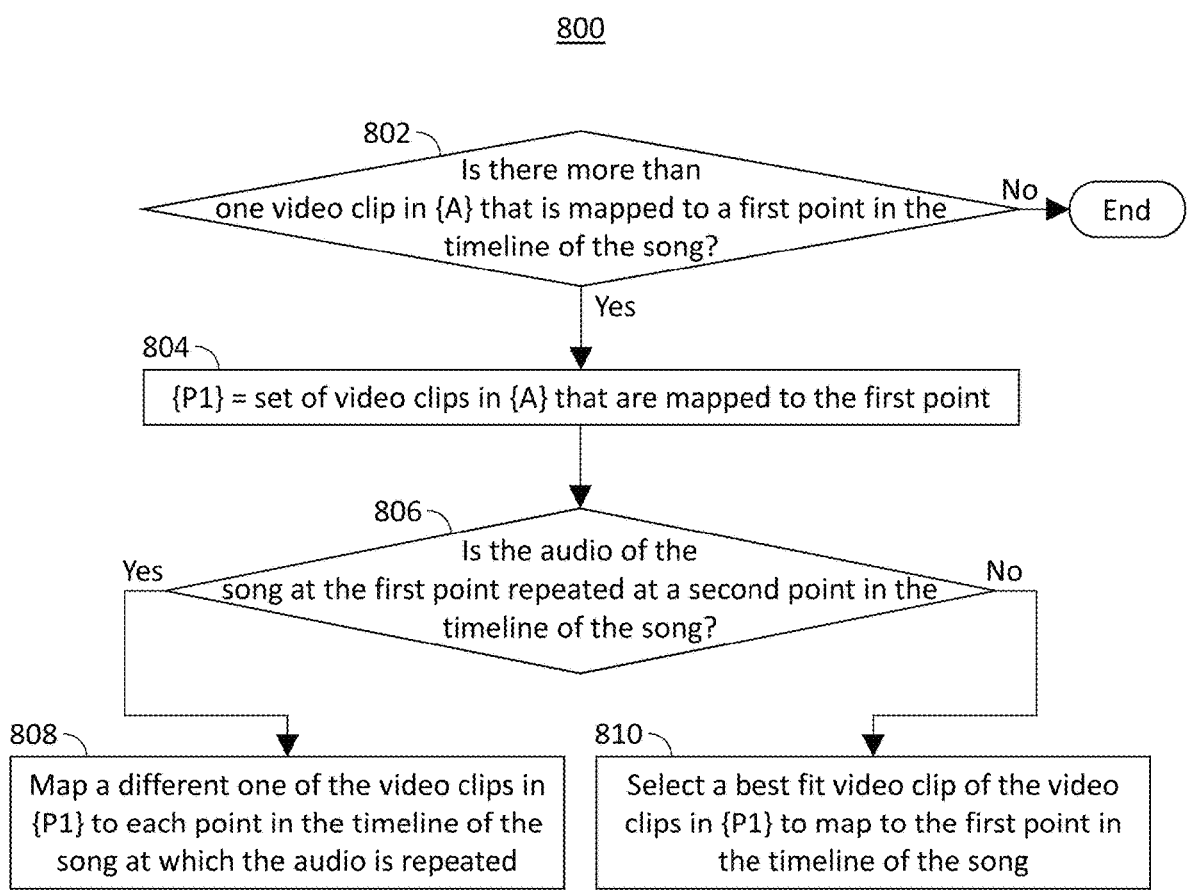
FIG. 8 is a flowchart representing an illustrative process for mapping video clips to a timeline of a song, in accordance with some embodiments of the disclosure.

FIG. 8 is a flowchart representing an illustrative process 800 for mapping video clips to a timeline of a song, in accordance with some embodiments of the disclosure. Process 800 may be implemented on control circuitry 208. In addition, one or more actions of process 800 may be incorporated into or combined with one or more actions of any other process or embodiment described herein.

At 802, control circuitry 208 determines whether there is more than one video clip in {A} that is mapped to a first point in the timeline of the song. As discussed above, a data structure may be used to track which portions of the timeline of the song have had video clips mapped to them. Multiple video clips may include the same portion of the song. Some video clips may contain portions of the song that overlap with portions of the song contained in other video clips. The data structure may track which video clips cover each time interval (e.g., one second) of the song. The data structure may include counters for each time interval that are incremented by one every time a video clip is mapped to that respective time interval. Control circuitry 208 may then retrieve, access, or obtain the value of the counter for each time interval, or may perform a count of the number video clip identifiers that have been mapped to the time interval. Control circuitry 208 may then determine, based on the count or the counter value, whether more than one video clip has been mapped to the first point in the timeline of the song.

If only one video clip has been mapped to the first point in the timeline of the song, or if no video clips have been mapped thereto, i.e., the first point is a gap to be filled ("No" at 802), then the process ends. If, however, more than one video clip has been mapped to the first point in the timelines of the song ("Yes" at 802), then, at 804, control circuitry 208 initializes a data structure {P1} containing the set of video clips in {A} that are mapped to the first point.

At 806, control circuitry 208 determines whether the audio of the song at the first point is repeated at a second point in the timeline of the song. For example, the first point may be a chorus of the song, which is repeated several times throughout the song. Control circuitry 208 may extract audio of the song for a duration beginning at the first point. The duration may be a preset duration (e.g., five seconds), a duration of a single video clip contained in {P1}, or an average duration of the video clips contained in {P1}. Control circuitry 208 may then use known audio analysis techniques to determine if there is a match for the audio at the first point at any other point in the timeline of the song.

If the audio at the first point is repeated at least at one other point ("Yes" at 806), then, at 808, control circuitry 208 maps a different one of the video clips in {P1} to each point in the timeline of the song at which the audio is repeated. In some embodiments, control circuitry 208 may first determine whether any video clips have already been mapped to any of the other points in the timeline of the song at which the audio is repeated. If so, control circuitry 208 may skip those portions when mapping videos contained in {P1} to other portions of the timeline of the song.

If the audio at the first point is not repeated anywhere else in the timeline of the song ("No" at 806), then, at 810, control circuitry 208 selects the best fit video clip of the clips in {P1} to map to the first point in the timeline of the song. A best fit video clip may be selected based on one or more factors. For example, control circuitry 208 may determine which of the video clips in {P1} is most popular. This may be accomplished using methods similar to those described above in connection with FIG. 4. Control circuitry 208 may determine which of the video clips in {P1} has the best quality video or the closest entropy score to other videos mapped to other portions of the timeline of the song. Control circuitry 208 may compare the content creators of all video clips in {P1} with the list of content creators whose video clips the user has liked to determine if there is a video clip in {P1} that was created by a content creator that the user has liked more often than video clips of other content creators represented by the video clips in {P1}.

The actions or descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
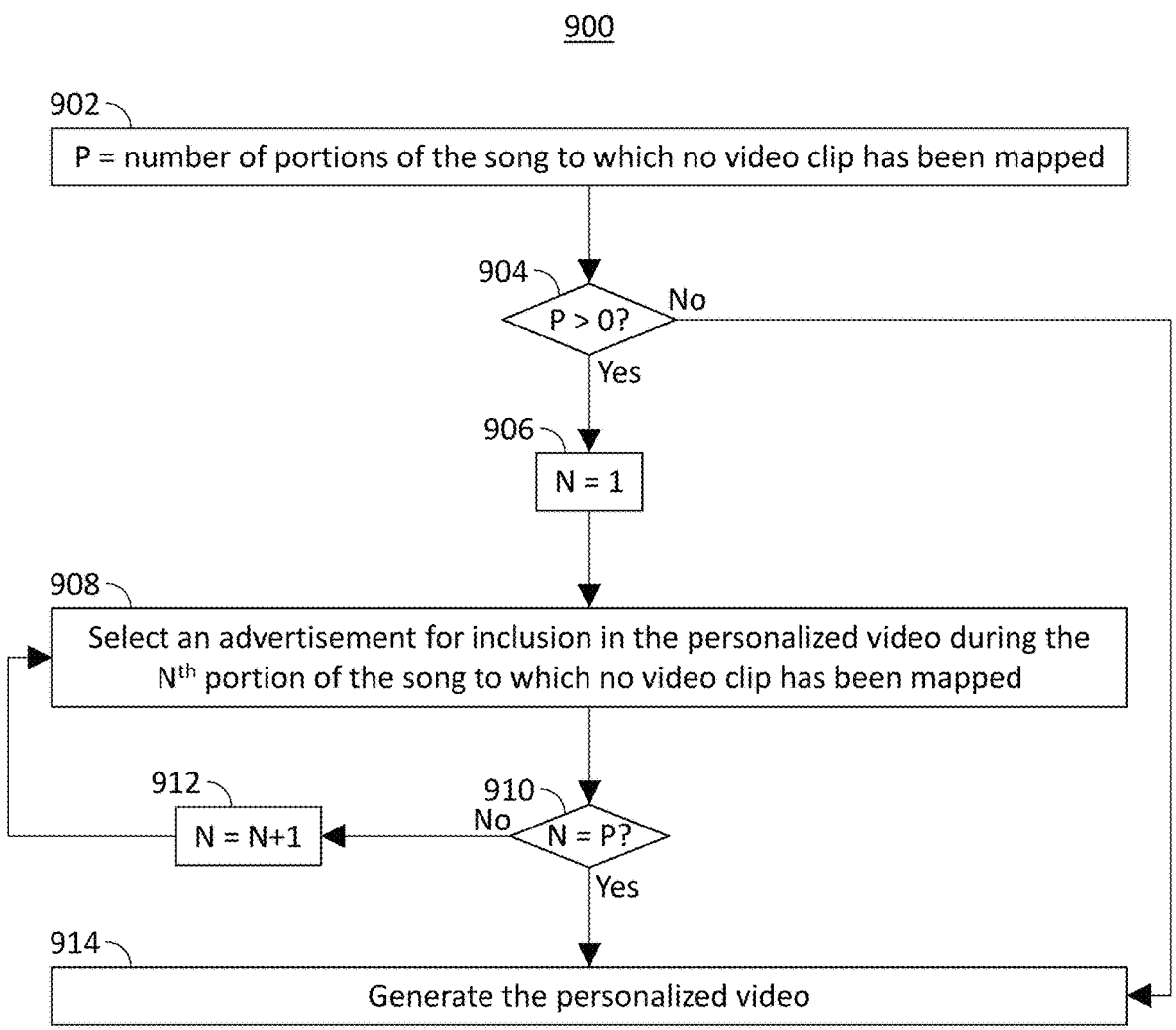
FIG. 9 is a flowchart representing an illustrative process for inserting advertisements into the personalized video, in accordance with some embodiments of the disclosure.

FIG. 9 is a flowchart representing an illustrative process 900 for inserting advertisements into the personalized video, in accordance with some embodiments of the disclosure. Process 900 may be implemented on control circuitry 208. In addition, one or more actions of process 900 may be incorporated into or combined with one or more actions of any other process or embodiment described herein.

At 902, control circuitry 208 initializes a variable P representing the number of portions of the song to which no video clip has been mapped. For example, control circuitry 208 may access the data structure used to track the mapping of video clips to the timeline of the song. The data structure may include counters for each time interval of the song whose values represent the number of video clips mapped their respective time intervals. Control circuitry 208 may determine if any of the counters have a value of zero. Alternatively, the data structure may include an index of portions to which no video clips have been mapped, which may be retrieved by control circuitry 208.

At 904, control circuitry 208 determines whether P is greater than zero. If so ("Yes" at 904), then at least one advertisement may be selected for inclusion in the personalized video. At 906, control circuitry 208 initializes a counter variable N, setting its value to one. At 908, control circuitry 208 selects an advertisement for inclusion in the personalized video during the $N^{th}$ portion of the song to which no video clip has been mapped. The advertisement may be a still image or a video advertisement, depending on the duration of the $N^{th}$ portion of the song. If the $N^{th}$ portion of the song has a short duration, a still image may be selected for inclusion during the $N^{th}$ portion. If the $N^{th}$ portion has a long duration, a video advertisement may be selected. If a video advertisement is to be selected, further consideration may be given by control circuitry 208 to the content of the advertisement, including its entropy score and whether it includes audio of the song.

At 910, control circuitry 208 determines whether N is equal to P, meaning that advertisements have been selected for all portions of the song to which no video clip has been mapped. If N is not equal to P ("No" at 910), then, at 912, control circuitry 208 increments the value of N by one, and processing returns to 908.

If a video clip has been mapped to every portion of the song ("No" at 904), or if N is equal to P ("Yes" at 910), at 914, control circuitry 208 generates the personalized video. If no advertisements were selected for inclusion, control circuitry 208 extracts video from each mapped video clip and joins them together in an order corresponding to the timeline of the song. If any video clip overlaps with another video clip, control circuitry 208 may perform a crossfade between the two video clips or may shorten one of the video clips to remove the overlapping portion. If any advertisements were selected for inclusion, control circuitry 202 may insert them between the mapped video clips at the appropriate points in the timeline of the song. Control circuitry 208 may mute the audio of all the video clips and advertisements and use audio of the song as the audio track for the personalized video.

The actions or descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
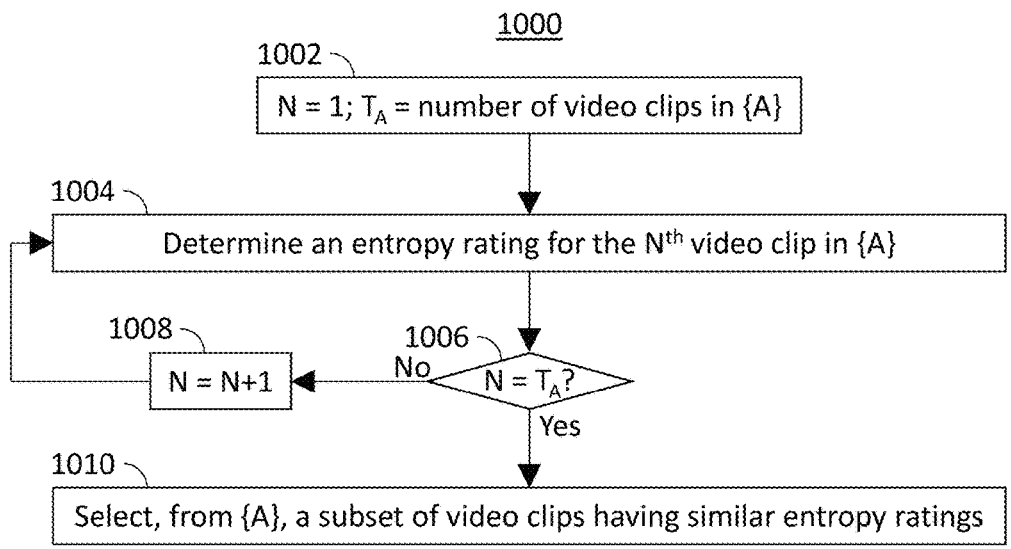
FIG. 10 is a flowchart representing an illustrative process for selecting video clips for inclusion in the personalized video based on entropy ratings, in accordance with some embodiments of the disclosure.

FIG. 10 is a flowchart representing an illustrative process 1000 for selecting video clips for inclusion in the personalized video based on entropy ratings, in accordance with some embodiments of the disclosure. Process 1000 may be implemented on control circuitry 208. In addition, one or more actions of process 1000 may be incorporated into or combined with one or more actions of any other process or embodiment described herein.

At 1002, control circuitry 208 initializes a counter variable N, setting its value to one, and a variable $T_A$ representing the number of video clips in {A}. At 1004, control circuitry 208 determines an entropy rating for the $N^{th}$ video clip in {A}. For example, control circuitry 208 may analyze each video clip for changes in color, brightness, shapes, etc. in the video data, and/or tonal variations, prosody, mel-frequency cepstrum coefficients (MFCCs), etc., in the audio data. The more changes detected in the $N^{th}$ video clip, the higher the entropy rating for the $N^{th}$ video clip. A machine learning model trained on video and/or audio data may be used in this analysis to help prevent high entropy scores resulting from simple background movements or noises. At 1006, control circuitry 208 determines whether N is equal to $T_A$, meaning that all video clips in {A} have been processed. If N is not equal to $T_A$ ("No" at 1006), then, at 1008, control circuitry 208 increments the value of N by one and processing returns to 1004.

If N is equal to $T_A$ ("Yes" at 1006), then, at 1008, control circuitry 208 selects, from {A}, a subset of video clips having similar entropy ratings. For example, control circuitry 208 may first determine a target entropy rating. This may be based, for example, on the rhythm of the song, or may be based on the average entropy rating of the most popular videos containing the song. Control circuitry 208 may then select videos having an entropy rating within a threshold deviation from the target entropy rating. For example, for a target entropy rating of five, control circuitry 208 may select videos having an entropy rating between four and six. If this selection returns too few video clips, the threshold deviation may be increased so that more video clips may be selected.

The actions or descriptions of FIG. 10 may be used with any other embodiment of this disclosure. In addition, the actions and descriptions described in relation to FIG. 10 may be done in suitable alternative orders or in parallel to further the purposes of this disclosure.

Figure 11:
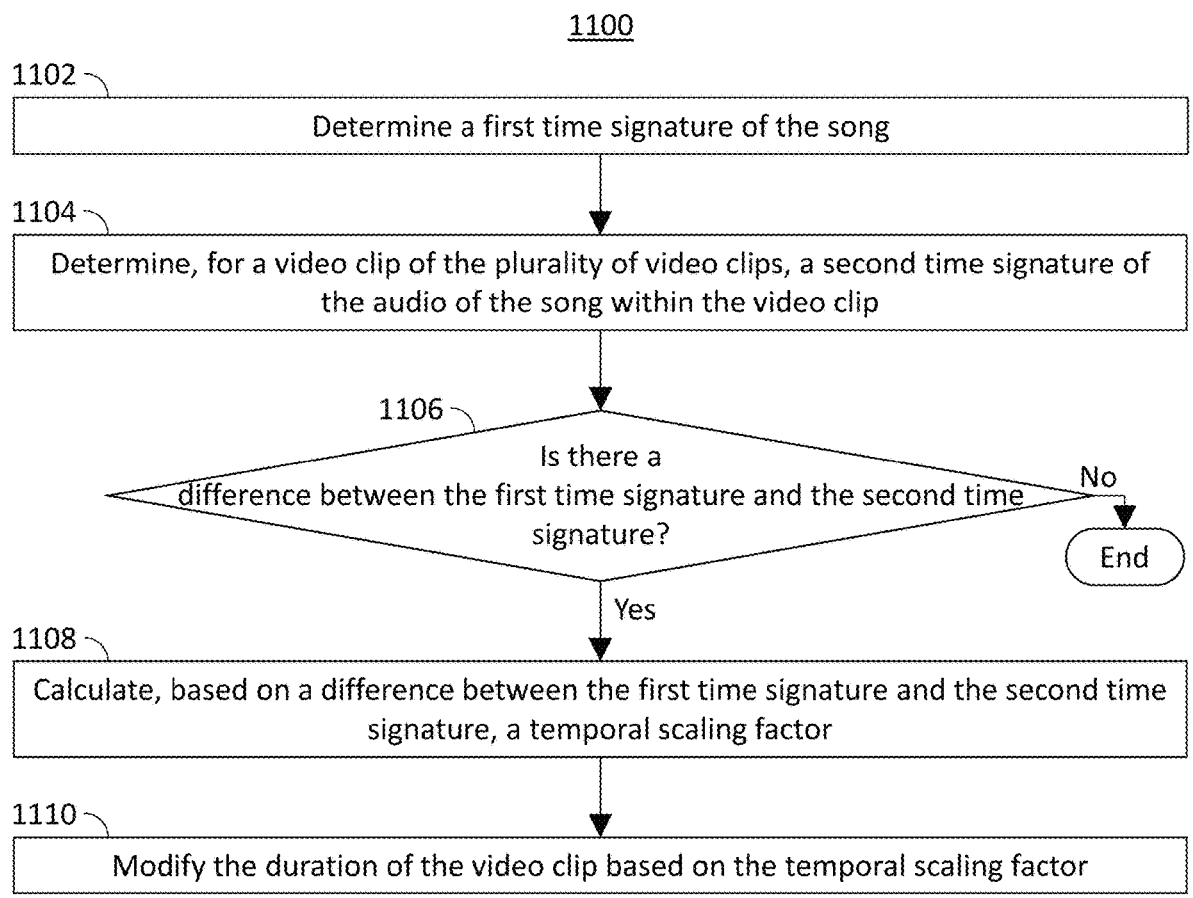
FIG. 11 is a flowchart representing an illustrative process for modifying the duration of a video clip to match a time signature of the song, in accordance with some embodiments of the disclosure.

FIG. 11 is a flowchart representing an illustrative process 1100 for modifying the duration of a video clip to match a time signature of the song, in accordance with some embodiments of the disclosure. Process 1100 may be implemented on control circuitry 208. In addition, one or more actions of process 1100 may be incorporated into or combined with one or more actions of any other process or embodiment described herein.

At 1102, control circuitry 208 determines a first time signature of the song. For example, control circuitry 208 may use audio analysis techniques to determine a number of beats per minute of the song. Alternatively, control circuitry 208 may access metadata corresponding to the song to determine a rhythm, or number of beats per minute, of the song. At 1104, control circuitry 208 determines, for a video clip of the plurality of video clips, a second time signature of the audio of the song within the video clip. This may be accomplished using the same methods as used to determine the first time signature of the song.

At 1106, control circuitry 208 determines whether there is a difference between the first time signature and the second time signature. For example, a video clip may use an altered playback speed version of the portion of the song for comedic, dramatic, or other effect, resulting in a faster or slower time signature compared to the original time signature of the song. If there is no difference between the first time signature and the second time signature ("No" at 1106), then the portion of the song contained in the video clip is unaltered and the process ends.

If, however, there is a difference between the first time signature and the second time signature ("Yes" at 1106), then, at 1108, control circuitry 208 calculates, based on the difference between the first time signature and the second time signature, a temporal scaling factor. For example, if the first time signature is 120 beats per minute and the second time signature is 100 beats per minute, then the video clip is using a slowed-down version of the audio of the song. Control circuitry 208 may use the ratio of the first time signature of the song to the second time signature of the video clip to calculate a temporal scaling factor. In this example, the temporal scaling factor would be 120/100, or 1.2. At 1110, control circuitry 208 modifies the duration of the video clip based on the temporal scaling factor. Control circuitry 208 decreases the duration of the video clip by increasing its playback speed. Control circuitry may use the temporal scaling factor as a multiplier for the playback speed of the video clip. In this example, control circuitry 208 may reencode the video clip at 1.2× playback speed so that the apparent time signature of the video clip matches the time signature of the song. Control circuitry 208 may reencode the video clip into a temporary video file before generating the personalized video, or may do so during generation of the personalized video.

The actions or descriptions of FIG. 11 may be used with any other embodiment of this disclosure. In addition, the actions and descriptions described in relation to FIG. 11 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for generating a personalized video for a song for a user, the method comprising:
   identifying a plurality of video clips comprising audio of the song, wherein identifying the plurality of video clips further comprises:
   retrieving metadata describing audio of available video clips;
   determining, based on the metadata, particular video clips of the available video clips having metadata indicative of presence of audio of at least a portion of the song; and
   identifying a subset of the particular video clips that are relevant to the user;
   determining a portion of the song corresponding to each video clip of the plurality of video clips;
   mapping each video clip of the plurality of video clips to a timeline of the song;
   selecting, from the plurality of video clips, a subset of video clips comprising different portions of the song;
   generating, from the subset of video clips, the personalized video for the song; and
   generating the personalized video for display.

2. The method of claim 1, wherein identifying the subset of the particular video clips that are relevant to the user further comprises:
   accessing a popularity metric for each video clip of the particular video clips; and
   identifying video clips of the particular video clips having a popularity metric above a threshold popularity.

3. The method of claim 1, wherein identifying the subset of the particular video clips that are relevant to the user further comprises:
   determining, for each video clip of the particular video clips, a content creator;
   accessing a list of content creators followed by the user;
   comparing the content creator of each video clip of the particular video clips with the list of content creators followed by the user; and
   identifying, based on the comparing, video clips of the particular video clips created by content creators followed by the user.

4. The method of claim 1, wherein identifying the subset of the particular video clips that are relevant to the user further comprises:
   determining, for each video clip of the particular video clips, a content creator;
   accessing a history of video clips liked by the user;
   determining, based on the history of video clips liked by the user, a list of content creators whose video clips were liked by the user;
   comparing the content creator of each video clip of the particular video clips with the list of content creators whose video clips were liked by the user; and
   identifying, based on the comparing, video clips of the particular video clips created by content creators whose video clips were liked by the user.

5. The method of claim 1, wherein identifying the subset of the particular video clips that are relevant to the user further comprises:
   determining, for each video clip of the particular video clips, a content creator;
   accessing a watch history of the user;
   identifying, based on the watch history, a plurality of content creators the user may be interested in;
   comparing the content creator of each video clip of the particular video clips with the plurality of content creators the user may be interested in; and
   identifying, based on the comparing, video clips of the particular video clips created by content creators the user may be interested in.

6. The method of claim 1, wherein identifying the subset of the particular video clips that are relevant to the user further comprises refraining from including, in the subset of the particular video clips, video clips created by a content creator previously blocked by the user.

7. The method of claim 1, further comprising:
determining that a video clip has not been mapped to at least a portion of the song; and
in response to determining that a video clip as not been mapped to at least a portion of the song, selecting an advertisement for inclusion in the personalized video clip during the at least a portion of the song.

8. The method of claim 1, wherein selecting, from the plurality of video clips, a subset of video clips comprising different portions of the song further comprises:
determining an entropy rating for each video clip of the plurality of video clips, wherein the entropy rating is based on an amount of movement in a video clip; and
selecting, from the plurality of video clips, a subset of video clips having similar entropy ratings.

9. The method of claim 1, further comprising:
determining a first time signature of the song;
determining, for a video clip of the plurality of video clips, a second time signature of the audio of the song within the video clip;
calculating, based on a difference between the first time signature and the second time signature, a temporal scaling factor; and
modifying a duration of the video clip based on the temporal scaling factor.

10. A method for generating a personalized video for a song for a user, the method comprising:
identifying a plurality of video clips comprising audio of the song;
determining a portion of the song corresponding to each video clip of the plurality of video clips;
mapping each video clip of the plurality of video clips to a timeline of the song, wherein multiple video clips of the plurality of video clips are mapped to a first point in the timeline of the song, and wherein the audio of the song at the first point is repeated in the song;
selecting a subset of the multiple video clips that are mapped to the first point in the timeline of the song, a number of the subset of the multiple video clips corresponding to a number of times the audio of the song at the first point is repeated in the song;
mapping each video clip of the subset of the multiple video clips that are mapped to the first point in the timeline of the song to a different point in the timeline of the song at which the audio of the song at the first point is repeated;
selecting, from the plurality of video clips, a subset of video clips comprising different portions of the song;
generating, from the subset of video clips, the personalized video for the song; and
generating the personalized video for display.

11. The method of claim 10, wherein the subset of video clips comprising different portions of the song, and the personalized video for the song, comprise the subset of the multiple video clips.

12. The method of claim 10, wherein the subset of the multiple video clips comprise audio of a chorus of the song.

13. A system for generating a personalized video for a song for a user, the system comprising:
control circuitry configured to:
identify a plurality of video clips comprising audio of the song, wherein the control circuitry configured to identify the plurality of video clips is further configured to:
retrieve metadata describing the audio of available video clips;
determine, based on the metadata, a particular video clips of the available video clips having metadata indicate of presence of audio of at least a portion of the song; and
identify a subset of the particular video clips that are relevant to the user;
determine a portion of the song corresponding to each video clip of the plurality of video clips;
map each video clip of the plurality of video clips to a timeline of the song;
select, from the plurality of video clips, a subset of video clips comprising different portions of the song; and
generate, from the subset of video clips, the personalized video for the song; and
media output circuitry configured to generate the personalized video for display.

14. The system of claim 13, wherein the control circuitry configured to identify the subset of the particular video clips that are relevant to the user is further configured to:
access a popularity metric for each video clip of the particular video clips; and
identify video clips of the particular video clips having a popularity metric above a threshold popularity.

15. The system of claim 13, wherein the control circuitry configured to identify the subset of the particular video clips that are relevant to the user is further configured to:
determine, for each video clip of the particular video clips, a content creator;
access a list of content creators followed by the user;
compare the content creator of each video clip of the particular video clips with the list of content creators followed by the user; and
identify, based on the comparing, video clips of the particular video clips created by content creators followed by the user.

16. The system of claim 13, wherein the control circuitry configured to identify the subset of the particular video clips that are relevant to the user is further configured to:
determine, for each video clip of the particular video clips, a content creator;
access a history of video clips liked by the user;
determine, based on the history of video clips liked by the user, a list of content creators whose video clips were liked by the user;
compare the content creator of each video clip of the particular video clips with the list of content creators whose video clips were liked by the user; and
identify, based on the comparing, video clips of the particular video clips created by content creators whose video clips were liked by the user.

17. The system of claim 13, wherein the control circuitry configured to identify the subset of the particular video clips that are relevant to the user is further configured to:
determine, for each video clip of the particular video clips, a content creator;
access a watch history of the user;
identify, based on the watch history, a plurality of content creators the user may be interested in;
compare the content creator of each video clip of the particular video clips with the plurality of content creators the user may be interested in; and
identify, based on the comparing, video clips of the particular video clips created by content creators the user may be interested in.

18. The system of claim 13, wherein the control circuitry configured to identify the subset of the particular video clips that are relevant to the user is further configured to refrain from including, in the subset of the particular video clips, video clips created by a content creator previously blocked by the user.

19. The system of claim 13, wherein multiple video clips of the plurality of video clips are mapped to a first point in the timeline of the song and wherein audio of the song at the first point is repeated in the song, and wherein the control circuitry is further configured to:
   select a subset of the multiple of video clips that are mapped to the first point in the timeline of the song, a number of the subset of the multiple video clips corresponding to a number of times the audio of the song at the first point is repeated in the song; and
   map each video clip of the subset of the multiple video clips that are mapped to the first point in the timeline of the song to a different point in the timeline of the song at which the audio of the song at the first point is repeated.

20. The system of claim 13, wherein the control circuitry is further configured to:
   determine that a video clip has not been mapped to at least a portion of the song; and
   in response to determining that a video clip as not been mapped to at least a portion of the song, select an advertisement for inclusion in the personalized video during the at least a portion of the song.

21. The system of claim 13, wherein the control circuitry configured to select, from the plurality of video clips, a subset of video clips comprising different portions of the song is further configured to:
   determine an entropy rating for each video clip of the plurality of video clips, wherein the entropy rating is based on an amount of movement in a video clip; and
   select, from the plurality of video clips, a subset of video clips having similar entropy ratings.

22. The system of claim 13, wherein the control circuitry is further configured to:
   determine a first time signature of the song;
   determine, for a video clip of the plurality of video clips a second time signature of the audio of the song within the video clip;
   calculate, based on a difference between the first time signature and the second time signature, a temporal scaling factor; and
   modify a duration of the video clip based on the temporal scaling factor.

* * * * *